(12) United States Patent
Adlersberg et al.

(10) Patent No.: US 11,176,949 B2
(45) Date of Patent: Nov. 16, 2021

(54) DEVICE, SYSTEM, AND METHOD FOR ASSIGNING DIFFERENTIAL WEIGHT TO MEETING PARTICIPANTS AND FOR GENERATING MEETING SUMMARIES

(71) Applicant: AudioCodes Ltd., Lod (IL)

(72) Inventors: Shabtai Adlersberg, Ra'anana (IL); Menachem Honig, Metar (IL); Tatiana Adar, Belle Mead, NJ (US)

(73) Assignee: AUDIOCODES LTD., Lod (IL)

( * ) Notice: Subject to any disclaimer, the term of this patent is extended or adjusted under 35 U.S.C. 154(b) by 96 days.

(21) Appl. No.: 16/805,779

(22) Filed: Mar. 1, 2020

(65) Prior Publication Data

US 2020/0243095 A1 Jul. 30, 2020

Related U.S. Application Data

(63) Continuation-in-part of application No. 16/260,160, filed on Jan. 29, 2019, now Pat. No. 10,963,505.

(51) Int. Cl.
*G10L 17/00* (2013.01)
*G06Q 10/10* (2012.01)
*G06F 16/683* (2019.01)

(52) U.S. Cl.
CPC ............ *G10L 17/00* (2013.01); *G06F 16/685* (2019.01); *G06Q 10/10* (2013.01)

(58) Field of Classification Search
CPC .... G06F 16/4393; G06F 40/56; G06F 16/433; G06F 16/483; G06F 16/9558; G06F 16/587; G06F 16/685; G06F 40/35; G06F 40/216; G06F 40/169; G06F 40/279; G06F 40/30; G10L 17/00; G06Q 10/1095; G06Q 10/10
See application file for complete search history.

(56) References Cited

U.S. PATENT DOCUMENTS

| | | | |
|---|---|---|---|
| 2002/0111817 A1* | 8/2002 | Cronin | G06Q 50/184 705/310 |
| 2011/0267419 A1* | 11/2011 | Quinn | G06F 3/04842 348/14.08 |
| 2014/0074857 A1* | 3/2014 | Liu | G06F 16/78 707/748 |
| 2016/0027442 A1* | 1/2016 | Burton | G10L 15/26 704/235 |
| 2017/0228135 A1* | 8/2017 | Vendrow | H04L 65/403 |

* cited by examiner

*Primary Examiner* — Andrey Belousov
(74) *Attorney, Agent, or Firm* — Eitan Mehulal Sadot

(57) ABSTRACT

Devices, systems, and methods for assigning differential weight to participants in a meeting, and for automatically generating summaries of meetings. A transcript of the meeting is generated or obtained; and meeting data and meta-data is analyzed, optionally utilizing textual analysis and Natural Language Processing (NLP). Roles or titles are determined for each participant; and a differential weight is allocated to utterances of each participant based on his role or title. Optionally, the weight is modified based on the relation between the participant's role and the topic of an utterance, or by taking into account the level of activity or passiveness of each participant. Optionally, a high-ranking participant is assigned a prevailing weight, with regard to all topics or with regard to a subset of topics. The system generates automatically a summary of approved decisions, approved action items, rejected proposals, or other insights.

18 Claims, 1 Drawing Sheet

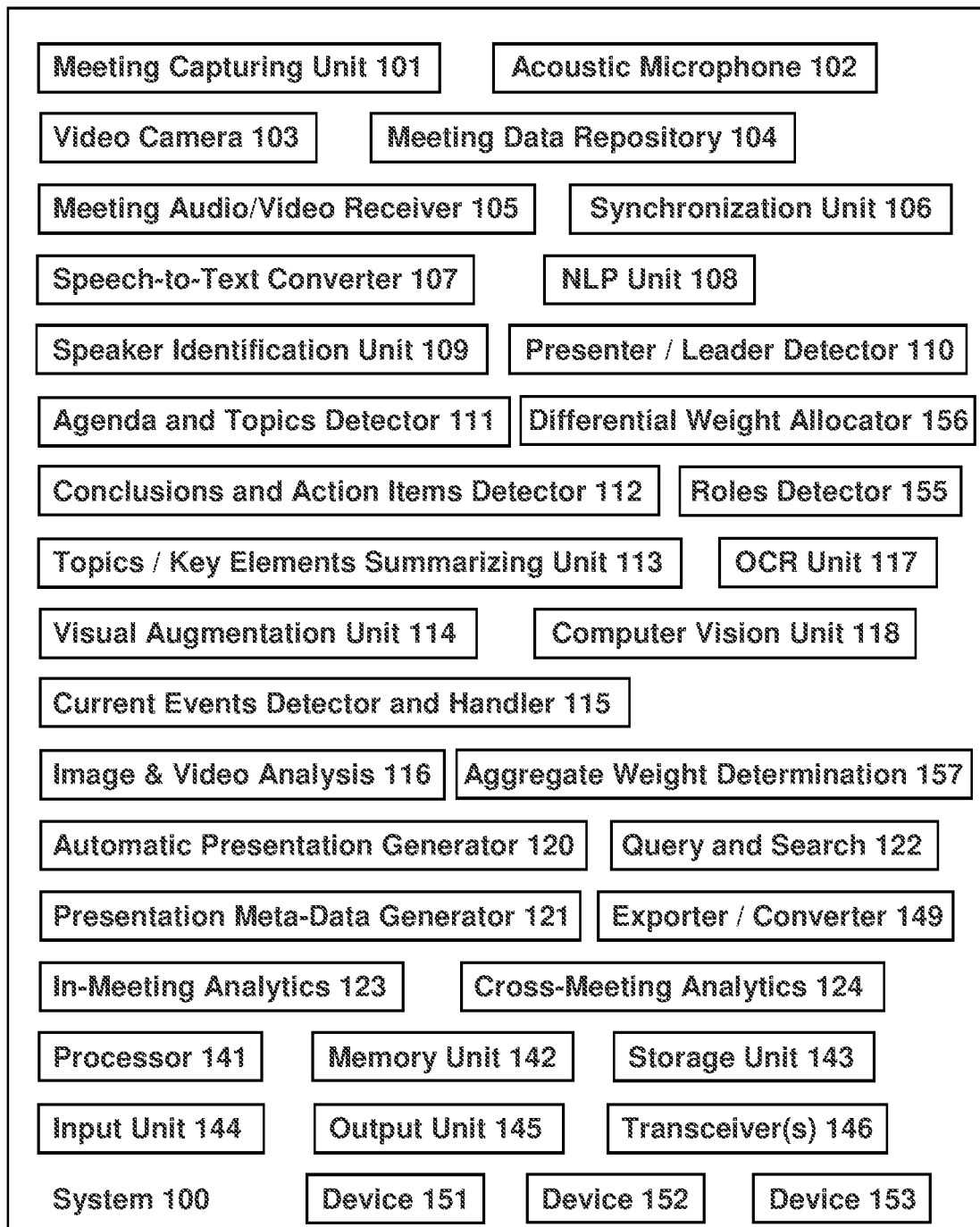

DEVICE, SYSTEM, AND METHOD FOR ASSIGNING DIFFERENTIAL WEIGHT TO MEETING PARTICIPANTS AND FOR GENERATING MEETING SUMMARIES

CROSS-REFERENCE TO RELATED APPLICATIONS

This patent application is a Continuation-in-Part (CIP) of U.S. Ser. No. 16/260,160, filed on Jan. 29, 2019, which is hereby incorporated by reference in its entirety.

FIELD

The present invention is related to the field of Information Technology.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

The present invention may include, for example, systems, devices, and methods for automatically generating presentations, and/or for automatically generating a visual representation which corresponds to a meeting or a discussion in which one or more topics were discussed. Such meeting may be, for example, a face-to-face/in-person meeting, a telephonic conference meeting, a video conference meeting, a hybrid or mixed meeting in which different users participate via different means, or other types of meetings.

The present invention may provide other and/or additional benefits or advantages.

BRIEF DESCRIPTION OF THE DRAWINGS

FIG. 1 is a schematic block-diagram illustration of a system, in accordance with some demonstrative embodiments of the present invention.

DETAILED DESCRIPTION OF SOME DEMONSTRATIVE EMBODIMENTS

The Applicants have realized that many people utilize a presentation in meetings: the presentation helps the presenter to focus on the important messages that he wants to convey or discuss, and it is also important for the other participants or the audience in order to focus on these messages and/or to remember the topics.

The Applicants have realized that a presentation may have other benefits; for example, since "a picture is worth a thousand words", adding a graphical slide, image or item to a presentation, may help the presenter to clarify a particular message, and/or may cause some of the other participants to better remember that particular message due to the accompanying picture.

The Applicants have further realized that it may be beneficial to have, at the beginning of a meeting, a written agenda of the meeting made available to the participants; and/or to have, at the end of the meeting, a summary of the topics discussed, the conclusions reached, the decisions reached, and the action items that were allocated to participants. Such agenda in advance, and summary at the end, may contribute to the efficiency of the meeting and/or to the follow-up handling of topics discussed therein.

The Applicants have realized that numerous meetings take place, as face-to-face meetings or as phone conference meetings or as video-conference meetings, without advance preparation of a presentation, and/or without preparing or distributing in advance a written agenda of topics, and/or without preparing or distributing after the meeting a written summary or a write-up of the conclusions or decisions or action items. The Applicants have also realized that for some meetings or discussions, the meeting leader or presenter, or an appointed participant or an assistant, is tasked with manually preparing a summary of the meeting or discussion; however, this is a time-consuming task, and the time and effort spent by such team-member can be shifted to other, more productive, tasks that the organization may need, if the system of the present invention operates to automatically generate the summary of the meeting or discussion instead of leaving this task to a human team-member.

The Applicants have also realized that in many meetings, the presenter or one or more of the participants may convey an interesting idea, which then gets lost or forgotten in the general conversation without being reflected in an already-written presentation that was prepared in advance for the meeting, and without being reflected in a summary of conclusions or decisions that was manually prepared regarding the meeting.

The Applicants have further realized that an automatic generation of a visual presentation, with regard to a meeting or a discussion that took place, may later assist the participants and/or the presenters and/or third parties (e.g., co-workers, legal department, accounting department, or the like) to capture the essence of the meeting and to follow-up on the performance and completion of action items that were discussed or presented at such meeting. Moreover, the automatic insertion or inclusion of graphical items (e.g., images, photographs, designed logos, or the like), into such automatically-generated presentation, may further assist such users in remembering key elements from the meeting and/or in focusing such users on specific points or items that were presented or discussed.

The present invention provides systems and method that may utilize, for example, voice transcription (speech to text engine), speaker identification, textual/contextual analysis, Natural Language Processing (NLP) or Natural Language Understanding (NLU), automatic retrieval of additional information from the Internet and/or from a local repository (e.g., an organizational or enterprise repository) and/or from third-party databases, as well as artificial intelligence (AI) and/or other functionalities, in order to determine and analyze "who said what" in a meeting or a discussion or a presentation, and to generate a visual presentation that includes textual and/or graphical components that correspond to key elements that were discussed or presented, and/or that further expand on such key elements; thereby analyzing what was said or discussed in a meeting, and automatically generating from it a visual layer that corresponds to it.

Some embodiments may automatically create, in an autonomous or artificial manner, a "post mortem" presentation that corresponds to the meeting or the discussion, as if the presenter and/or the participants would have created such presentation before the meeting or before the discussion; and optionally also including within such presentation additional materials or ideas or to-do items or action items that were discussed or presented in the meeting (or discussion) without necessarily being planned in advance by the presenter, thereby generating a visual presentation that may be, in some situation, even better in its quality than a presentation that was prepared in advance prior to the meeting and which does not necessarily reflect the actual discussion in the meeting, or that misses or lacks important portions that were discussed in the meeting without necessarily being planned ahead as discussion points. Such automatically-generated presentation may include multiple components or slides or pages or chapters; for example, a subject or title or main topic of the meeting; an agenda of topics and sub-topics discussed; a textual and/or visual portion that corresponds to each topic/sub-topic as discussed; decisions and conclusions; action items or "to do" items, or allocation of tasks to particular persons or entities; summary; questions that need to be further researched or answered; data and meta-data about the meeting (e.g., list of participants; list of active participants who talked; list of silent participant who attended but did not talk; name of presenter(s); date and time of the meeting; date and time, or time-slots, in which each participant talks; talking time of each participant; aggregate talking time of all participants; relative ratio of talking times of participants (e.g., participant Adam talked during 40% of the meeting length, whereas participant Bob talked during 5% of the meeting length); identification of order or repeating order of talking (e.g., automatic identification that participant Adam, in 90 percent of his talks, has talked immediately after participant Bob; or other data or analyzed data regarding talking time of participants in the meeting or the discussion); or the like.

Such data may be automatically generated and organized in a searchable format, which enables the organization or users to later retrieve and search through the data; such as, by utilizing search queries of "show me the presentations for all meetings that discussed the Acme Product", or "show me all the slides in this presentation that refer to the Acme Product", or "show me all slides or portions in this presentation that reflect input or utterances by participant John Smith", or "show me all action items from all meetings that took place in November 2018 and that mentioned at least once the Acme Product", or the like; and the system may parse such or similar queries, may search the data and/or meta-data of automatically-generated presentations, and may output the relevant portions or slides from the relevant presentation(s); thereby making use of past meetings, of past discussion, and of the automatically-generated presentations that correspond to them.

The system may automatically add visual, textual and/or graphical content from external sources that are external to the meeting itself; for example, if the meeting included a discussion of a recent real-world event (e.g., hurricane in Florida; or municipal elections in Los Angeles), then the system may automatically obtain text and/or graphics and/or content-items (e.g., including also news articles, or hyperlinks to news articles) that correspond to such that event(s) and/or that provide additional data about such events. Similarly, if a particular corporation or organization or person was discussed (e.g., at least one time during the meeting, or at least N times during the meeting), then the automatically-generated presentation may further comprise a graphical item of the logo of that corporation or organization, or of the image of that person, or the like. Such automatically-generated visual items serve not only in order to beautify the generated presentation, but rather, they also serve as attention-grabbing content-items that may assist a user to consume, understand and/or remember the relevant portions of the meeting and/or to act on them and/or to focus the user's attention on particular elements in the meeting, thereby assisting users to later review the meeting content in a useful and efficient manner, and/or assisting users to memorize such content and/or to process it more efficiently.

Some embodiments of the present invention may automatically generate "from scratch" a comprehensive, visual, presentation that corresponds to a meeting or discussion that took place, without the need to provide to the system any slide(s) or content other than an audio recording or an audio input from the meeting, which the system then autonomously analyzes. Other embodiments may utilize some, or all, of a previously-prepared presentation that may have been prepared for the meeting, and may revise or expand or modify such previously-prepared presentation in order to make it reflect the actual discussions that took place in real-life in the meeting, and/or may add new slides or artificial slides to such presentation, or may augment or modify the content of particular slide(s) of the previously-prepared presentation.

The terms "meeting" or "discussion" as used herein may include, for example, a face-to-face meeting, a telephonic meeting, a telephone conference call, a video meeting, a video conference call, a hybrid or mixed meeting in which one or more users participate in person and/or one or more other users participate via telephone and/or one or more other users participate via video conferencing and/or one or more other users participate via other means (e.g., via a messaging application or a chat application), or the like.

Reference is made to FIG. 1, which is a schematic block diagram illustration of a system 100, in accordance with some demonstrative embodiments of the present invention.

System 100 may comprise a Meeting Capturing Unit 101, able to capture and/or record and/or acquire audio and/or video and/or audio-video of a meeting. For example, an acoustic microphone 102 may capture audio of a meeting; and optionally, a video camera 103 or imager may capture video or audio-and-video of a meeting. The captured audio/video data is stored in a Meeting Data Repository 104. Additionally or alternatively, such audio and/or video may be received from an external source, such as, from a tele-conferencing service that is operated by a third party; for example, a Meeting Audio/Video Receiver 105 may receive audio/video of such meeting from the external source or from the third-party, and may store it (in its original format, or after being reformatted) in the Meeting Data Repository 104.

In some embodiments, audio/video data of a single meeting may reach the Meeting Data Repository 104 from multiple sources, for example, from an audio microphone that recorded the meeting within a conference room in which several participants have attended in person, as well as from a tele-conferencing service or a "telephonic bridge" service which provided a telephonic bridge or a teleconferencing service or a video-conference service to some other participants in that meeting that did not attend the conference room in person but rather have attended the meeting remotely via such remote access tools.

A synchronization unit 106 may perform initial analysis of the audio and/or video data from all sources, and may normalize the data or may determine the overlapping and/or the non-overlapping portions of such multiple data streams or data sources. For example, the synchronization unit 106 may analyze the data and may detect that the acoustic microphone within the conference room has provided an audio recording of the entire meeting from 11:00 AM until 11:45 AM; whereas, the tele-conferencing service has provided an audio recording of almost (but not all) of the entire meeting, from 11:03 AM until 11:42 AM. The synchronization unit 106 may thus detect that there may be some meeting-portions that are reflected only in the audio captured by the local microphone within the conference room, and that are not reflected in the tele-conference recorded audio. The synchronization unit 106 may optionally flag or otherwise notify this scenario to other components of the system, to notify or to alert them that there are non-overlapping portions of the meeting that exist only in a particular source and not in other source(s) of audio and/or video.

A speech-to-text converter 107 may process all the audio from all sources, and may generate a textual transcript of the discussions held in the meeting. Optionally, a Natural Language Processing (NLP) unit 108 may perform initial analysis or the transcript, in order to improve it and/or to fine-tune it or to remove ambiguities or to make corrections. For example, participant Adam said during the meeting "we need two cars for this project"; the speech-to-text converter 107 may initially transcribe this phrase as "we need to cars for this project"; and the NLP unit 108 may then fine-tune and correct this to be "we need two cars for this project" based on an NLP analysis that detects the plural form "cars" after the word "two", and that selects it to be "two" rather than "to" or "too".

A speaker identification unit 109 may further analyze the audio/video data, and/or the generated transcript, and/or other meta-data; and may identify that a particular participant has spoken at particular time-slots; and may tag or mark his utterances or his audio-portions as belonging to him. In some embodiments, the speaker identification may be based on contextual analysis of content; for example, if Participant A said "I often ask myself, James, how can we fix this problem?", then the speaker identification unit 109 may determine that Participant A is James. Similarly, if Participant B said "What do you, Bob, think about this?", and then Participant C says "Well, Rachel, this is a great question", then the speaker identification unit 109 may determine that Participant B is Rachel and that Participant C is Bob. In another example, the audio recording of the meeting may be correlated with data from a scheduling application or a calendar application, in order to obtain data or meta-data that can be used for speaker identification; for example, the calendar entry for the Northern Conference Room may show a meeting that took place from 11:00 AM to 11:45 AM, with participants "Rachel, Bob, James"; the speaker identification unit 109 may identify a female voice based on a higher frequency or higher pitch of utterances, or based on contextual analysis (e.g., a participant responds with "I think she is right in which she has just said"), thereby determining that a particular participant is female, and correlating this determination with calendar/scheduling data in order to deduce that this female participant is Rachel. The speaker identification unit 109 may augment or modify the transcript of the meeting, by adding to eat the actual names of participants; or, at least, by adding to the transcript generic place-holders such as "Participant A" and "Participant B" and "Participant C" if they real names cannot be deduced based on the current data.

The speaker identification unit 109 may further utilize a Presenter/Leader Detector 110 to determine which participant is the presenter or leader of the meeting; for example, based on contextual analysis of audio (e.g., the first participant who talked and said "I have initiated this meeting in order to discuss our goals", is thus identified as the Presenter/Leader of the meeting), and/or based on meta-data such as the length of time that each participant talked (e.g., Participant A has talked 80 percent of the meeting; Participant B has talked 12 percent of the meeting; Participant C has talked 8 percent of the meeting; therefore Participant A is determined to be the presenter/leader of that meeting).

An Agenda and Topics Detector 111 analyzes the transcript of the meeting and/or other data or meta-data, in order to extract or determine the planned agenda that is presented and/or the topics (and sub-topics) that are discussed. For example, an NLP unit may analyze the transcript, and may identify the agenda based on a phrase that Participant B said within the first N minutes (e.g., within the first 3 minutes) of the meeting, such as, "The purpose of this meeting is to discuss how to market our Acme Product in Europe"; and may thus determine the Agenda of that meeting to be "Marketing the Acme Product in Europe". Similarly, a textual or contextual analysis of the transcript by the Agenda and Topics Detector 111 may detect a phrase such as "We now turn to discuss the budget that would be required in year 2019 for this marketing campaign" at time-point 11:27 AM, and may further detect the words "budget" and "marketing campaign" uttered several more times between 11:27 AM to 11:32 AM, thereby leading the Agenda and Topics Detector 111 to determine that a topic of "Budget for Marketing Campaign" was discussed at the time-slot of 11:27 AM to 11:32 AM. Optionally, the Agenda and Topics Detector 111 may utilize other sources in order to reach such determinations; for example, by retrieving the meeting data from a scheduler application or a calendar application that showed the meeting as being titled "Meeting to discuss the 2019 marketing campaign of the Acme Product in Europe".

Similarly, a Conclusions and Action Items Detector 112 may analyze the transcript of the meeting, as well as other sources of information, in order to deduce and/or determine any conclusions, decisions, and/or action-items or "to do" items that were discussed or concluded in the meeting. For example, the Conclusions and Action Items Detector 112 may determine an action item based on detecting in the meeting transcript an utterance of "As a third action item, James will research the cost of television ads in France"; or may determine a conclusion or a decision by detecting an utterance of "In conclusion, we decide not to advertise the Acme Product in sports magazines in Spain". Optionally, the Conclusions and Action Items Detector 112 may fetch or obtain data from other sources, such as, from a project management software of the organization, which may already be updated with such action items or "to do" items that were manually created by one or more of the participants; and may inject or add or insert such action items obtained from that resource into the presentation that is being automatically generated for that meeting. The system of the present invention may thus insert, into an automatically-generated presentation of a particular meeting, one or more action items or "to do" items that are obtained from a scheduling application or a calendar application or a project management application or a tasks allocation application, even though such external data was not necessarily already available during the meeting itself.

A Topics/Key Elements Summarizing Unit 113 further analyzes the transcript, optionally by utilizing Artificial Intelligence (AI) and/or Machine Learning (ML) techniques, in order to generate a summary and/or key elements of each topic that was discussed in the meeting. For example, an analysis of the transcript may indicate to the system that "budget" or "marketing campaign in Europe" was discussed from 11:27 AM until 11:32 AM; and that Participant A has spoken 60 percent of that time-slot, and mentioned in his spoken utterances "we have a first option, which is" and also "there is a second option, which is"; and may generate a summary along the line of "Participant A has presented two options for the marketing campaign in Europe, which were discussed from 11:27 AM to 11:32 AM".

A Visual Augmentation Unit 114 may analyze the transcript in order to detect particular words or phrases or names that can and/or should be augmented with a visual content-item, such as graphics or image or photograph or animation. For example, repeated utterances in the meeting regarding the marketing campaign in "France", may trigger the Visual Augmentation Unit 114 to obtain an image of the map of France or of the flag of France or of an item or monument that is typically associated with France (e.g., an image of the Eifel Tower; an image of a French bread or "baguette"); and to generate a notification that this visual component should be added, automatically, by the system to the slide or portion of the presentation that are associated with the "marketing campaign in France". Similarly, the Visual Augmentation Unit 114 may detect that a portion of the meeting has repeatedly mentioned "Senator Bob Smith", and may obtain from the Internet an image of that person (e.g., via an Image Search through a search engine), in order to augment the generated presentation with such image in the relevant portions or slides that refer to that person. Similarly, the Visual Augmentation Unit 114 may detect that a portion of the meeting had a four-minute discussion about "how can we market our Acme Product to Big-Corp"; and may obtain from the Internet an image of the logo of that corporation (Big-Corp), via an Image Search through a search engine, in order to augment the generated presentation with such image in the relevant portions or slides that refer to that corporation.

Similarly, the Visual Augmentation Unit 114 may be configured to automatically detect in the transcript positive/success indicators (e.g., an utterance such as "this was a great achievement", or an utterance of "I am glad to report that sales have tripled during the last quarter"), and to obtain from a repository or from the Internet visual content item(s) that correspond to such positive/success indicators (e.g., an arrow pointing upward; a graph showing growth; a gold medal). Similarly, the Visual Augmentation Unit 114 may be configured to automatically detect in the transcript negative/problem indicators (e.g., an utterance such as "we failed to market our product in Germany", or an utterance of "I am sad to update that our sales have decreased in half during the last quarter"), and to obtain from a repository or from the Internet visual content item(s) that correspond to such negative/failure indicators (e.g., an arrow pointing down; a graph showing decline).

A Current Events Detector and Handler 115 operates to detect in the transcript references to particular current event(s), which many meetings may include, and which often do not appear in a presentation that was prepared in advance of a meeting (if at all such presentation was prepared or would have been prepared). For example, the Current Events Detector and Handler 115 may detect multiple utterances by multiple participants, which referred to "the hurricane in Florida" or to the "municipal elections in Los Angeles"; may identify this as a current event, for example, based on an Internet search that is focused on News Items (e.g., detecting that the phrase "hurricane in Florida" has at least N search results (e.g., at least 50 search results) from the past D days (e.g., from the three days prior to the meeting date) in the News section of a search engine.

The Current Events Detector and Handler 115 may then proceed to obtain from the Internet a content item about that news event, such as an article or an image that corresponds to that event; and to add such text or image or content item to the presentation being generated, or to add a hyperlink to such external content item to the presentation being generated.

Optionally, an Image & Video Analysis Unit 116 may analyze images and/or video that were captured or recorded or acquired as part of the meeting; for example, by a photo or video camera, by a fixed or mobile projector or a projecting device or system, by a slides presentation device, by a "smart board" or computerized board or blackboard or presentation board, by a computing device that can take or save screenshots of shown images, or the like. The images/video of the meeting, or portions thereof, may be analyzed by using one or more processing techniques; and the results of such processing, as well as associated data or content that may be generated or fetched from other sources, may then be incorporated into the automatically-generated presentation.

For example, an Optical Character Recognition (OCR) Unit 117 may perform OCR on captured images or video-frame(s), such as a video-frame showing the content that the presenting person had written on a smart-board or a regular board during the discussion, and may identify that he wrote "Problem: reduced profit" and "Solution: increase our marketing budget", and may extract these words as textual elements (and/or as images or image-portions) and they may be included or incorporated into the automatically-generated meeting summary.

Additionally or alternatively, a Computer Vision Unit 118 may apply a computer vision algorithm to such captured images and/or videos and/or video-frames, and may identify or recognize objects or items that are shown or presented during the meeting; for example, the meeting leader may hold a product (e.g., a box of cereal) in his hand and may describe verbally the marketing efforts that were done by the organization to market that product, and the Computer Vision Unit 118 may analyze the relevant images or video-segments or video-frames (e.g., optionally by detecting which images or video-portions are associated with the particular audio-segment that talks about that product), and may identify the product held by the speaker using computer vision, and may incorporate into the automatically-generated presentation an image of that product (e.g., extracted from the video frame; or, a higher-quality image of that product as obtained from the Internet via an image search or via a search engine, or as obtained from an internal or external repository of images or from an image-bank service).

In another example, the Image & Video Analysis Unit 116 may detect an image or a video-frame which shows an Agenda or a "list of topics" or a "to-do list" or an "action items" list, that were presented or shown during the meeting; may extract from them the relevant textual components (e.g., via OCR, or by Computer Vision); and may incorporate or add such content into the automatically-generated presentation; thereby creating automatically an Agenda slide, or a "list of topics" or "table of contents" slide, or a "summary/conclusion" slide, or a "to-do list" or "action items" slide; or thereby adding materials and text and/or images into such type(s) of automatically-generated slide(s) of the presentation that is being generated. Such content may not necessarily be available as part of the meta-data of the meeting (e.g., in the Invitation to the meeting via a calendar application or a scheduling application), yet the system may obtain and extract such data, as described, from images and/or video-portions or screen-shots that were captured during the meeting. Similarly, portions of such images or video-segments may be automatically embedded into, or inserted into, the automatically-generated presentation, in addition to (or instead of) the extracted textual content.

In some embodiments, an In-Meeting Analytics Unit 123 may analyze the data and meta-data that is available to the system and/or that was generated or processed by the system, and may generate in-meeting analytics or insights that pertain to a single particular meeting; for example: each topic/sub-topic as discussed; decisions and conclusions; action items or "to do" items, or allocation of tasks to particular persons or entities; summary; questions that need to be further researched or answered; data and meta-data about the meeting (e.g., list of participants; list of active participants who talked; list of silent participant who attended but did not talk; name of presenter(s); date and time of the meeting; date and time, or time-slots, in which each participant talks; talking time of each participant; aggregate talking time of all participants; relative ratio of talking times of participants (e.g., participant Adam talked during 40% of the meeting length, whereas participant Bob talked during 5% of the meeting length); identification of an order or a repeating order of talking (e.g., automatic identification that participant Adam, in 90 percent of his talks, has talked immediately after participant Bob; or other data or analyzed data regarding talking time of participants in the meeting or the discussion); or the like. Such data and insights may further be processed in order to be included (e.g., in textual format; or as images or visual representation, such as, an automatically-generated Pie Chart of Bar Chart that shows the talk time of each participant in that meeting) in the automatically-generated presentation that summarizes the meeting, and/or to be included as an external log or file or meta-data about the meeting, and/or to be accessible for searching and querying as described.

Similarly, in some embodiments, a Cross-Meeting Analytics Unit 124 may analyze the data and meta-data that is available to the system and/or that was generated or processed by the system, and may generate cross-meeting analytics or insights that pertain to multiple meetings in the aggregate; for example: each topic/sub-topic as discussed in such multiple meetings; a list of topics that were discussed in all the meetings; a list of topics that were discussed on only a single meeting; decisions and conclusions; action items or "to do" items, or allocation of tasks to particular persons or entities; summary; questions that need to be further researched or answered; data and meta-data about the meeting (e.g., list of participants; list of active participants who talked; list of silent participant who attended but did not talk; name of presenter(s); date and time of the meeting; date and time, or time-slots, in which each participant talks; talking time of each participant; aggregate talking time of all participants; relative ratio of talking times of participants (e.g., participant Adam talked during 40% of the meetings length, whereas participant Bob talked during 5% of the meetings length); identification of an order or a repeating order of talking (e.g., automatic identification that participant Adam, in 90 percent of his talks, has talked immediately after participant Bob; or other data or analyzed data regarding talking time of participants in the meeting or the discussion); or the like. The analysis may be performed relative to the aggregated data across multiple meetings; for example, thereby identifying and detecting that in multiple meetings, user Adam typically talks immediately after user Bob, or determining that across multiple meetings user Charles talks on average 45% of the meeting length, or the like. Such data and insights may further be processed in order to be included (e.g., in textual format; or as images or visual representation, such as, an automatically-generated Pie Chart of Bar Chart that shows the talk time of each participant in that meeting) in one or more of the automatically-generated presentation(s) that summarizes the meetings, and/or to be included as an external log or file or meta-data about the meeting(s), and/or to be accessible for searching and querying as described. In some embodiments, the cross-meeting analysis may be performed by the system, on demand, with regard to a subset of the meetings; such as, "run the cross-meeting analysis regarding all the meetings that took place in 2018", or "run the cross-meeting analysis regarding all the meetings that took place in August 2018 and that Adam participated in them", or "run the cross-meeting analysis regarding all the meetings in 2017 that discussed the topic of Budget", or the like In some embodiments, the Cross-Meeting Analytics Unit 124 may further generate insights with regard to related meetings correlation (e.g., recurrent, events) performance metrics. For example, the system may analyze and generate insights with regard to recurrent meeting AI execution time (e.g., or other performance metrics); and may indicate, for example, that current and/or previous AI execution time for a previously-processed meeting and/or for a currently-processed meeting; and optionally showing or presenting such cross-meeting data or insights side-by-side or using a Bar Chart or a Pie Chart or other visual representation.

An Automatic Presentation Generator 120 may collect the data and/or content items that was generated or detected or prepared by the other components, and may generate or create a presentation that corresponds to the meeting. For example, the Automatic Presentation Generator 120 may generate a slide with the Title of the meeting; a slide with the Agenda or Topic List of the meeting; multiple slides with summaries of each topics or sub-topics; a slide with conclusions and decisions; a slide with action items or "to do" items"; a slide with meta-data about the meeting (names and type of participants; name and role of presented/leader; time-slot of the meeting; time-slots in which each user participated; means of participation by each user). Optionally, at least one of the generated slides, or at least some of the generated slides, may comprise augmented content-item(s), such as an image of a person or a place that was discussed, or a visual or graphical content-item that corresponds to failure or success or to positive or negative indicators, or a hyperlink to a current event, or a brief description of image of a current event, or other augmented content.

The Automatic Presentation Generator 120 may operate in conjunction with a presentation meta-data generator 121, able to generate meta-data or links or tags or pointers that may be associated with particular portions of the generated presentation, and/or which may enable efficient and user-friendly searching or querying of the generated presentation. For example, an automatically-generated slide of "Action Items", may comprise three bullet-point textual phrases that correspond to three Action Items that were detected; and each of those bullet-point items may contain a hyperlink or a button or a pointer that, if engaged by the user who views the presentation, cause the system to playback the particular audio portion (and/or video portion) that corresponds to the discussion of that particular action item. Similarly, a Conclusion in the Conclusions Slide may be linked to the particular time-slot in the audio recording of the meeting, in which the presenter summarizes the conclusions of the meeting.

A query and search unit 122 may enable a user to submit queries, that are then parsed by the system in order to retrieve and display (or play-back) the particular presentations and/or the particular presentation-portions or slide(s) that match such queries. For example, the query and search unit 122 may present a free-text query field, or an advanced search interrace that utilizes multiple fields and Boolean operators (e.g., "Agenda=Marketing" and "Participants=Rachel" and "Date=in 2018"; or, "Date=in November 2018" and "Action Items allocated to =Rachel"). The query and search unit 122 may analyze the automatically-generated presentation(s) or slides, and/or the original transcript of the meeting or discussion, in order to generate the search results and to make them accessible for viewing/consumption by the querying user.

The above-mentioned units or modules of the system may be implemented using, for example, a Processor 141, a Memory Unit 142, a Storage Unit 143, an Input Unit 144 (e.g., keyboard, keypad, touch-screen, microphone, mouse, touch-pad, smart-board), an Output Unit 145 (e.g., screen, touch-screen, projector, display unit, monitor, television, audio speakers), one or more transceivers 146 (e.g., Wi-Fi transceiver, cellular transceiver, Bluetooth transceiver), one or more wired and/or wireless communication modules (e.g., Network Interface Card (NIC), network adapter, modem), and/or other suitable hardware components and/or software components. Optionally, an Exporter/Converter Unit 149 may export of convert the automatically-generated presentation (and/or other insights or data or meta-data) into one or more suitable formats or file structures or data structures, for example, as a PowerPoint presentation file, as a Microsoft Word file, as a Microsoft Excel file, as a PDF file, as a Comma Separated Values (CSV) file, or the like.

In some embodiments, a method comprises: obtaining or capturing or receiving an audio recording of a meeting; obtaining or generating or receiving a transcript of said meeting from said audio recording; automatically generating a visual presentation that corresponds to particular key elements in said meeting. Key Elements of the meeting may include one or more of the above-discussed data-items, such as, agenda, topics, conclusions, action-items, to-do list, participants, meeting meta-data, participants, leader, topics, or the like.

In some embodiments, the method comprises: based on textual analysis of said transcript, determining a main topic of said meeting; and generating a slide in said visual presentation that comprises said main topic.

In some embodiments, the method comprises: based on analysis of meeting scheduling data, determining a main topic of said meeting; and generating a slide in said visual presentation that comprises said main topic.

In some embodiments, the method comprises: determining at least one topic that was discussed in said meeting, based on textual analysis of said transcript; generating a slide in said visual presentation that comprises said topic, and further comprises a textual summary of utterances about said topic in said meeting.

In some embodiments, the method comprises: determining at least one topic that was discussed in said meeting, based on analysis of scheduling data of said meeting; generating a slide in said visual presentation that comprises said topic, and further comprises a textual summary of utterances about said topic in said meeting.

In some embodiments, the method comprises: based on textual analysis of said meeting, determining at least one conclusion that was conclude in said meeting; generating a slide in said visual presentation that comprises said conclusion.

In some embodiments, the method comprises: based on textual analysis of said meeting, determining at least one action item that was allocated in said meeting; generating a slide in said visual presentation that comprises said action item.

In some embodiments, the method comprises: detecting a correlation between (i) a portion of the transcript of the meeting that discussed a particular action item, and (ii) data of an application that manages allocated action items; based on said correlation, determining that said particular action item was allocated in said meeting; generating a slide in said visual presentation that comprises said particular action item.

In some embodiments, the method comprises: based on textual analysis of said meeting, determining at least one person that was discussed in said meeting; obtaining from a repository an image of said person; generating a slide in said visual presentation that comprises at least said image of said person.

In some embodiments, the method comprises: based on textual analysis of said meeting, determining at least one corporation that was discussed in said meeting; obtaining from a repository an image of a logo of said corporation; generating a slide in said visual presentation that comprises at least said image of said logo of said corporation.

In some embodiments, the method comprises: based on textual analysis of said meeting, determining at least one product that was discussed in said meeting; obtaining from a repository an image of said product; generating a slide in said visual presentation that comprises at least said image of said product.

In some embodiments, the method comprises: based on textual analysis of said meeting, determining at least one geographical location that was discussed in said meeting; obtaining from a repository an image of said geographical location; generating a slide in said visual presentation that comprises at least said image of said geographical location.

In some embodiments, the method comprises: based on textual analysis of said meeting, determining a recent news event that was discussed in said meeting; obtaining from a repository an image that corresponds to said recent news event; generating a slide in said visual presentation that comprises at least said image of said recent news event.

In some embodiments, the method comprises: based on textual analysis of said meeting, determining a recent news event that was discussed in said meeting; obtaining from a repository a hyperlink to a news article about said recent news event; generating a slide in said visual presentation that comprises at least said hyperlink to the news article about said recent news event.

In some embodiments, the method comprises: determining a real-life identity of a presenter of said meeting; generating a slide in said visual presentation that comprises at least said real-life identity of said presenter of said meeting.

In some embodiments, the method comprises: generating a plurality of slides in said visual presentation, wherein a first slide comprises: (i) a summary of a first topic, and (ii) a first User Interface element that, when engaged, causes the method to play-back a first portion of an audio recording of said meeting that corresponds to said first topic; wherein a second slide comprises: (i) a summary of a second topic, and (ii) a second User Interface element that, when engaged, causes the method to play-back a second portion of the audio recording of said meeting that corresponds to said second topic.

In some embodiments, the method comprises: generating a plurality of slides in said visual presentation, wherein a first slide comprises: (i) a summary of a first topic, and (ii) a first User Interface element that, when engaged, causes the method to display a first portion of the transcript of said meeting that corresponds to said first topic; wherein a second slide comprises: (i) a summary of a second topic, and (ii) a second User Interface element that, when engaged, causes the method to display a second portion of the transcript of said meeting that corresponds to said second topic.

In some embodiments, the method comprises: receiving a request to find a meeting-portion that corresponds to criteria indicated in a particular search query; performing a search through data and meta-data of said visual presentation, based on said criteria; displaying to a user a particular slide of the visual presentation, which corresponds to the meeting-portion that corresponds to said criteria that were indicated in said particular search query.

Some embodiments may comprise a non-transitory storage medium having stored thereon instructions that, when executed by a hardware processor, cause the hardware processor to perform a method as described above.

Some embodiments may comprise an apparatus comprising a hardware processor configured to perform a method as described above.

In accordance with the present invention, system 100 may comprise several end-user devices which may be utilized by users to participate or to attend a meeting. For demonstrative purposes, three such end-user devices are shown in FIG. 1, as devices 151-153; although there may be other number of participants and respective devices. For example, device 151 may be a smartphone of User Adam; device 152 may be a tablet of User Bob; and device 153 may be a laptop computer of User Carla. Each one of such devices may be equipped with an acoustic microphone able to capture the audio spoken by the respective participant; as well as one or more audio speakers or headphones or earphones able to produce sounds and audio of the meeting (e.g., speech and audio originating from the other participants).

System 100 may operate to determine and to allocate Differential Weight to the audio input provided by each participant, based on one or more pre-defined conditions or rules or parameters; and may then utilize the differential weight in order to determine that a particular meeting-portion corresponds to an Accepted Decision or to a Decided Action Item, or conversely, corresponds to a Rejected Suggestion or to a Rejected Proposal.

In a demonstrative embodiment, system 100 may obtain and/or may deduce and/or may determine autonomously, information about the corporate role of each participant in the meeting, and/or other information relevant to the process of assigning differential weight to participants' inputs. For example, a Roles Detector Unit 155 may determine that User Adam is the CEO of the organization, by analyzing the email invitation that corresponds to the meeting, and extracting from it the list of participants which included the string "Adam Brown—CEO", and performing a string analysis using NLP algorithms and/or textual analysis and/or contextual analysis to determine that User Adam is the CEO. Similarly, the Roles Detector Unit 155 may determine that User Bob is a junior assistant, based on a textual analysis of emails that led to scheduling this meeting, by analyzing such emails and detecting the phrase "Bob will attend the meeting as an assistant to take notes", and by extracting or deducing the role of User Bob accordingly. Similarly, the Roles Detector Unit 155 may determine that User Carla is the CTO of the organization, based on her email signature which reads "Carla Gold, CTO".

Additionally or alternatively, the Roles Detector Unit 155 may request from each participant (e.g., when he joins the meeting, or prior to his joining the meeting, or during the meeting, or even upon completion of the meeting) to indicate explicitly his role in the organization and/or in the meeting; such that, for example, User Adam may utilize his device 151 to indicate explicitly that he is CEO, while User Bob may utilize his device 152 to indicate that he is the Assistant.

Additionally or alternatively, the Roles Detector Unit 155 may request from one particular participant, or from a meeting organizer (e.g., the user who organized or created the meeting, and/or who invited other participants to the meeting), to explicitly identify and indicate the role of each participant (e.g., when such organizer creates or organizes the meeting; or when he joins the meeting, or prior to his joining the meeting, or during the meeting, or even upon completion of the meeting); thereby allowing the meeting organizer (e.g., and only him) to define roles for each participant. For example, a meeting organizing tool or a meeting creating tool, may enable the organizing user to invite other users to the meeting, while also allowing him to designate or indicate the title or the role of each such invitee or participant.

Additionally or alternatively, the Roles Detector Unit 155 may estimate such roles of each participant, and may present the estimated roles for the review of a particular user (e.g., the meeting organizer) in order to obtain his approval or modifications or corrections; or, may present to each participant the deduced role or the estimated role that the system estimated for him and may request his approval or his modifications or correction (e.g., when he joins the meeting, or prior to his joining the meeting, or during the meeting, or even upon completion of the meeting). For example, the Roles Detector Unit 155 may deduce, from emails or from the data or meta-data of the meeting scheduling, that User Adam is the CEO; and may present to User Adam, as he joins the meeting (or during the meeting, or even after the meeting) an inquiry, "Are you indeed the CEO? Please confirm or modify your role", thereby allowing User Adam to confirm his role, or conversely to modify or correct it. Optionally, instead of posing the question to each one of the participants, the questions may be posed to the meeting organizer, who may confirm or correct the roles of each participant.

In some embodiments, the Roles Detector Unit 155 may deduce or estimate the role of a participant, based on textual and/or contextual analysis of data or meta-data, and may also utilize textual analysis and/or NLP analysis of the transcript of the meeting. For example, the transcript of the meeting may include a phrase that User Bob said, "Guys, I think that Adam as our CEO should decide on this important matter"; and may deduce from that transcript segment that the role of User Adam is CEO. In some implementations, the Roles Detector Unit 155 may deduce or estimate or determine the role of a participant by analyzing the text or the content of a presentation or slides (e.g., a PowerPoint presentation) that was presented in the meeting, and/or was shared or was otherwise associated with a meeting; for example, since Slide 6 in that presentation mentions that "Carla as CTO will describe the company's revenue stream", thereby enabling the Roles Detector Unit 155 to determine that Carla is the CTO.

In some embodiments, the Roles Detector Unit 155 may optionally utilize a pre-defined lookup table, or company director or organization directory, or an organizational chart or an "org chart", which may list or otherwise indicate or show the names and/or titles and/or roles of personnel or key persons in the company. For example, a single person on behalf of the entire organization (e.g., Human Resources manager) may prepare, upload and/or share with system 100 such an organizational chart or an organizational directory of persons, with their names and titles; and the Roles Detector Unit 155 may thus perform a lookup inquiry in order to match between the meeting participant "Adam Brown" and his corresponding role or title "CEO" in the organizational chart or corporate directory.

In some embodiments, optionally, the system may autonomously import or determine such chart, based on analysis of a website or a web-page that belongs to the organization. For example, the meeting may include User Adam, who was invited to participate via an email that was sent to "Adam.Brown@Company.com". The Roles Detector Unit 155 may autonomously access the website "Company.com", and may crawl and/or download the website or portions thereof; and particularly, may be configured to search for web-pages that are titled "Our Team" or "Our Management" or "About Us", and may perform textual analysis and/or NLP analysis of such web-pages and website content in order to determine that "Adam Brown" is the "CEO" of that "Company.com", based on textual analysis or NLP analysis of the "Our Management" web-page on that website. Optionally, such determined roles may be brought to the attention of the meeting organizer, or to the attention of each participant in the meeting or some participants, for their approval or for their correction or modification.

In accordance with the present invention, a Differential Weight Allocator Unit 156 may operate to allocate or assign or determine a different weight, to transcript segments or transcript portions or other data-items that are associated with different roles or different participants in the same meeting. In a demonstrative embodiment, a lookup table may be used to indicate that items that were said or uttered by the CEO of the organization, should be associated with 50 points; that items that were said or uttered by the CTO or CFO of the organization, should be associated with 28 points; and that items that were said or uttered by a Junior Assistant should be associated with 1 point. In some embodiments, the lookup table may match between roles or titles (e.g., CEO, CFO, project manager, assistant) and the respective weight that should be assigned to segments that they said (e.g., indicated by points, or by a percentage value, or by other numerical value or quantitative indicator). In other embodiments, the lookup table may match between names of persons in the organization (e.g., "Adam", "Bob", "Carla") and the respective weight that should be assigned to segments that they said (e.g., indicated by points, or by a percentage value, or by other numerical value or quantitative indicator).

In some embodiments, optionally, a multiplier or a coefficient or other parameter may be utilized, in order to increase the weight of a particular participant or a particular segment, if one or more conditions hold true. For example, system 100 may be configured with a pre-defined condition or rule, that if a particular Participant has spoken more than 50 percent of the entire meeting, then, the Weight that should be assigned to the items said by that participant would be 1.75 times the "original" or "regular" weight that is typically assigned to that person or to that role; and therefore, if User Carla who is the CTO has spoken for 53 percent of the entire meeting time, then instead of allocating 28 points to items associated with her, such items would be allocated 49 points (which is 1.75 times 28 points). In other embodiments, such rule or condition may be configured to apply, selectively, only to persons that are above a pre-defined ranking level in the organization, or only to a closed list of users or participants, and not necessarily to all the participants; in order to filter-out low-level or low-ranking participant who happened to talk for a long time during the meeting.

In some embodiments, optionally, the relative weight that is assigned to a particular participant, may be multiplied (or divided) by a coefficient that relates to the relative participation time of that participant in that meeting; in order to selectively increase the weight of participants that actively participated in the meeting, and/or to selectively decrease the weight of participants who were generally passive in the meeting. For example, in a demonstrative example, a participant's original weight (e.g., in points) may be increased, by an additional number of points that match the number of percentage points of his participation; such that, for example, a participants that talked for 25 percent of the meeting, would be allocated 25 additional points of weight, and/or would be allocated 1.25 times his original weight; these are only demonstrative formulas, and other suitable formulas may be used in order to modify the relative weight of participants by taking into account how active or how passive they were during the meeting.

In some embodiments, optionally, the weight allocated to a participant may be a function of, for example, not only his title or role in the organization, and/or not only his level of activity in the meeting, but also his specific role in the specific meeting. For example, system 100 may be configured such that the relative weight of a participant who is the Meeting Organizer, would be 1.5 times the "original" or "regular" weight of such participant; and therefore, a CFO that attends Meeting 1 as a regular participant would be assigned a weight of 20 points, whereas the same CFO who attends Meeting 2 as the Meeting Organizer would be assigned a weight of 30 points. This may enable the system to allocate an increased weight to the Meeting Organizer, in this example. In other example, the system may be configured to allocate an increased weight to the participant who was identified as the Meeting Leader (may not necessarily be the Organizer; and may not necessarily be the highest-ranking person in the meeting), or to other participants based on other pre-defined rules or criteria.

Accordingly, the Conclusions and Action Items Detector 112 may operate by taking into account (i) the role or title of each participant as determined by the Roles Detector Unit 155, and (ii) the differential weight that was determine for each participant by the Differential Weight Allocator Unit 156, and (iii) one or more pre-defined rules or conditions that may operate on transcript segments or transcript portions in order to detect and determine action items, conclusion, suggestions that were approved in the meeting, suggestions that were rejected in the meeting, and/or other statements or items, optionally using textual analysis and/or NLP analysis of the transcript of the meeting.

For example, the transcript of the meeting may indicate that User Bob said "I think that we should sell Green Acre". The Roles Detector Unit 155 operates to determine that this was said by the Junior Assistant, and therefore this phrase is assigned a weight of one point. However, the transcript also indicates that immediately after that utterance, User Adam said "this is an excellent idea, let's do so immediately"; and the Roles Detector Unit 155 determines that this was said by the CEO, thus providing 50 points of weight to that phrase. A textual analysis of NLP analysis also indicates that the text said by the CEO, is Supportive relative to the text said by the previous speaker; and therefore, their points are added together to reach 51 points for that phrase. The Conclusions and Action Items Detector 112 may apply a rule that determines, that a phrase that gained at least 45 points in the aggregate, should be regarded and handled as an Action Item or as a Conclusion or as an Approved Decision; and the system outputs that item as an Action Item that was approved.

In another example, the system may identify that the transcript indicates that User Carla said "I think that we should buy Blue Acre"; and that her role in the organization is CTO; and thus, the weight that is assigned to this phrase is 28 points. However, the system detects that the transcript also indicates, that this phrase by User Carla was followed by a phrase by User Adam who said "This is a bad idea, we should not do that"; the system identifies that User Adam has the role of CEO, and assigns a weight of 50 points to his utterance. A textual analysis or NLP analysis indicates that the phrase of the CEO was Opposing to the phrase of the CTO, and therefore the system takes the 28 points (weight allocated to the CTO) and subtracts from it the 50 points (weight allocated to the CEO), reaching a result of −22 points; indicating that this is a non-decision or not an action item; or determining that the suggestion of the CTO to sell Blue Acre has been Rejected in this meeting, since it did not reach the threshold of 45 points or above, or since it gained a negative total weight.

The system may thus accumulate the weights as various participants discuss the same topic; and may check textually or contextually or via NLP analysis whether they support an item or oppose it, in order to Add their weighted points or to Subtract their weighted points. These operations may be performed by an Aggregate Weight Determination Unit 157.

In some embodiments, optionally, one or more rules may be utilized to indicate a "prevailing vote" or a "veto" or a "golden vote" of a particular participant; for example, indicating that any utterance that is said by the CEO or by the President of the company, should outweigh and should prevail over all other utterances, even if they accumulate a sufficient number of points to be regarded as a decision or as an action item. For example, even if the CTO and the CFO and the COO said, each one in his turn, "I think that we should sell Red Acre", and the total points of that utterance has reached 120 points, the CEO of the company has said "I do not like this idea", and this outweighs and prevails over the cumulative score or weight; even if typically an utterance by the CEO is associated only with (for example) 50 points of weight.

In some embodiments, optionally, more complex rules may be defined and applied by system 100, to take into account the weight of participants and also the type of Topic that the item is related to. For example, system 100 may be configured to reflect, that the CFO of the organization has a weight of 25 points with regard to items that relate to "money" or "budget" or "finance" or "revenue" or "income" or "expenses"; but has a weight of only 14 points with regard to items that relate to "technology" or "computers" or "timeline" or "marketing". Similarly, the system may define that the Chief Marketing Officer would be assigned a weight of 42 points when the utterance is about "marketing" or "sales" or "advertising", but would be assigned only a weight of 17 points when the utterance is about "downsizing" or "real estate" or "computers". In some embodiments, optionally, the Differential Weight Allocator Unit 156 may utilize a lookup table or a database, that indicates: (i) which words or keywords, when said by a particular type of participant (e.g., CTO), trigger an increased weight; and (ii) which words or keywords, when said by that same type of participant (e.g., CTO), trigger a reduced weight; thereby enabling the system to allocated or to assign an increased weight to an utterance by the CTO when he talks about "computer servers", but to allocate or to assign a reduced weight to another utterance by that same CTO when he talks about "marketing". This may enable the system to dynamically allocate differential weight to utterances, by taking into account the context and/or topic of the utterance, in addition to the characteristics of the uttering participant.

In some embodiments, a method comprises: obtaining an audio recording of a meeting; obtaining a transcript of said meeting from said audio recording; allocating differential weight to utterances of different participants in said meeting. In some embodiments, the method further comprises: determining an aggregate weight for a particular item in said meeting, based on cumulative weights of utterances of a plurality of participants in said meeting regarding said item.

In some embodiments, the method comprises: if said aggregate weight is greater than a pre-defined threshold value, then: determining that said particular item is an approved decision or an approved action item. In some embodiments, the method comprises: if said aggregate weight is smaller than a pre-defined threshold value, then: determining that said particular item is a rejected proposal.

In some embodiments, the allocating comprises: determining that a particular participant in the meeting has a particular organizational title; allocating a pre-defined weight to utterances of said particular participant in said meeting. In some embodiments, the method comprises: determining that said particular participant has said particular organizational role, based on a pre-defined lookup table that matches between participant names and organization titles.

In some embodiments, the method comprises: determining that said particular participant has said particular organizational role, based on analysis of an organizational chart or a corporate directory. In some embodiments, the method comprises: determining that said particular participant has said particular organizational role, based on Natural Language Processing (NLP) analysis of a portion of said transcript which indicates that said particular participant has said particular organizational role.

In some embodiments, the method comprises: determining that said particular participant has said particular organizational role, based on analysis of scheduling information related to said meeting. In some embodiments, the allocating comprises: determining that a particular participant in the meeting has a particular organizational title; allocating a pre-defined weight to utterances of said particular participant in said meeting; dynamically modifying said pre-defined weight, only with regard to utterances that contain one or more pre-defined keywords.

In some embodiments, the allocating comprises: determining that a particular participant in the meeting has a particular organizational title; allocating a pre-defined weight to utterances of said particular participant in said meeting; dynamically modifying said pre-defined weight, only with regard to utterances that are determined to relate to a particular topic, based on NLP analysis of the transcript of said meeting.

In some embodiments, the allocating comprises: determining that a particular participant in the meeting has a particular organizational title; allocating a pre-defined weight to utterances of said particular participant in said meeting; dynamically modifying said pre-defined weight, by taking into account a level of activity or passiveness of said particular participant in said meeting.

In some embodiments, the allocating comprises: based on textual analysis of emails and messages, that invite participants to attend said meeting, determining organizational roles of each participant, and allocated to each participant a pre-defined weight; dynamically adjusting the pre-defined weight, that is assigned to a particular utterance of a particular participant, based on a level of relevance of the topic of said particular relevance to the organizational role of said participant.

In some embodiments, the method comprises: based on textual analysis of the transcript, determining that a particular participant opposes a particular suggested item; and reducing a cumulative weight, that as accumulated for said particular suggested item, by the weight that is allocated to said particular participant that opposes.

In some embodiments, the method comprises: allocating a prevailing weight to utterances of a particular participant, wherein said prevailing weight prevails over any cumulative weights of all other participants. In some embodiments, the method comprises: analyzing email addresses of participants in said meetings, and extracting at least one website related to said email addresses; analyzing content of said website, and constructing from said content at least a partial organizational chart; allocating weight to utterances of participants, based on said partial organizational chart that was constructed from content of said website.

In some embodiments, the method comprises: performing textual analysis and NLP analysis of the transcript of said meeting, and analysis of meta-data about participants of said meeting; constructing a proposed list of roles of participants; presenting said proposed list of roles of participants, to an organizer of said meeting for confirmation or modification; and applying to said proposed list of roles one or more confirmations or modifications that said organizer provides.

In some embodiments, the method comprises: performing textual analysis and NLP analysis of the transcript of said meeting, and analysis of meta-data about participants of said meeting; constructing a list of estimated roles of participants; presenting to each participant in said meeting, a request to confirm or to modify his estimated role.

In some embodiments, the method comprises: based on cumulative weights that are assigned to a first utterance in said meeting, determining that said first utterance is an approved decision; based on cumulative weights that are assigned to a second utterance in said meeting, determining that said first utterance is a rejected proposal; automatically generating a meeting summary report, indicating at least one of: (i) a list of approved decisions, (ii) a list of rejected proposals.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:
1. A method comprising:
obtaining an audio recording of a meeting;
obtaining a transcript of said meeting from said audio recording;
allocating differential weight to utterances of different participants in said meeting;

determining an aggregate weight for a particular item in said meeting, based on cumulative weights of utterances of a plurality of participants in said meeting regarding said item;
if said aggregate weight is greater than a pre-defined threshold value, then: determining that said particular item is an approved decision or an approved action item.

2. A method comprising:
obtaining an audio recording of a meeting;
obtaining a transcript of said meeting from said audio recording;
allocating differential weight to utterances of different participants in said meeting;
determining an aggregate weight for a particular item in said meeting, based on cumulative weights of utterances of a plurality of participants in said meeting regarding said item;
if said aggregate weight is smaller than a pre-defined threshold value, then: determining that said particular item is a rejected proposal.

3. The method of claim 1,
wherein the allocating comprises:
determining that a particular participant in the meeting has a particular organizational title;
allocating a pre-defined weight to utterances of said particular participant in said meeting.

4. The method of claim 3, comprising:
determining that said particular participant has said particular organizational role, based on a pre-defined lookup table that matches between participant names and organization titles.

5. The method of claim 3, comprising:
determining that said particular participant has said particular organizational role, based on analysis of an organizational chart or a corporate directory.

6. The method of claim 3, comprising:
determining that said particular participant has said particular organizational role, based on Natural Language Processing (NLP) analysis of a portion of said transcript which indicates that said particular participant has said particular organizational role.

7. The method of claim 3, comprising:
determining that said particular participant has said particular organizational role, based on analysis of scheduling information related to said meeting.

8. The method of claim 1,
wherein the allocating comprises:
determining that a particular participant in the meeting has a particular organizational title;
allocating a pre-defined weight to utterances of said particular participant in said meeting;
dynamically modifying said pre-defined weight, only with regard to utterances that contain one or more pre-defined keywords.

9. The method of claim 1,
wherein the allocating comprises:
determining that a particular participant in the meeting has a particular organizational title;
allocating a pre-defined weight to utterances of said particular participant in said meeting;
dynamically modifying said pre-defined weight, only with regard to utterances that are determined to relate to a particular topic, based on NLP analysis of the transcript of said meeting.

10. The method of claim 1,
wherein the allocating comprises:
determining that a particular participant in the meeting has a particular organizational title;
allocating a pre-defined weight to utterances of said particular participant in said meeting;
dynamically modifying said pre-defined weight, by taking into account a level of activity or passiveness of said particular participant in said meeting.

11. A method comprising:
obtaining an audio recording of a meeting;
obtaining a transcript of said meeting from said audio recording;
allocating differential weight to utterances of different participants in said meeting;
wherein the allocating comprises:
based on textual analysis of emails and messages, that invite participants to attend said meeting, determining organizational roles of each participant, and allocating to each participant a pre-defined weight;
dynamically adjusting the pre-defined weight, that is assigned to a particular utterance of a particular participant, based on a level of relevance of the topic of said particular utterance to the organizational role of said participant.

12. A method comprising:
obtaining an audio recording of a meeting;
obtaining a transcript of said meeting from said audio recording;
allocating differential weight to utterances of different participants in said meeting;
based on textual analysis of the transcript, determining that a particular participant opposes a particular suggested item; and reducing a cumulative weight, that as accumulated for said particular suggested item, by the weight that is allocated to said particular participant that opposes.

13. The method of claim 1, further comprising:
allocating a prevailing weight to utterances of a particular participant, wherein said prevailing weight prevails over any cumulative weights of all other participants.

14. A method comprising:
obtaining an audio recording of a meeting;
obtaining a transcript of said meeting from said audio recording;
allocating differential weight to utterances of different participants in said meeting;
analyzing email addresses of participants in said meetings, and extracting at least one website related to said email addresses;
analyzing content of said website, and constructing from said content at least a partial organizational chart;
allocating weight to utterances of participants, based on said partial organizational chart that was constructed from content of said website.

15. The method of claim 1, comprising:
performing textual analysis and NLP analysis of the transcript of said meeting, and analysis of meta-data about participants of said meeting;
constructing a proposed list of roles of participants;
presenting said proposed list of roles of participants, to an organizer of said meeting for confirmation or modification; and applying to said proposed list of roles one or more confirmations or modifications that said organizer provides.

16. The method of claim 1, comprising:

performing textual analysis and NLP analysis of the transcript of said meeting, and analysis of meta-data about participants of said meeting;

constructing a list of estimated roles of participants;

presenting to each participant in said meeting, a request to confirm or to modify his estimated role.

17. A method comprising:

obtaining an audio recording of a meeting;

obtaining a transcript of said meeting from said audio recording;

allocating differential weight to utterances of different participants in said meeting;

based on cumulative weights that are assigned to a first utterance in said meeting, determining that said first utterance is an approved decision;

based on cumulative weights that are assigned to a second utterance in said meeting, determining that said first utterance is a rejected proposal;

automatically generating a meeting summary report, indicating at least one of: (i) a list of approved decisions, (ii) a list of rejected proposals.

18. A system comprising:

a hardware processor configured to execute code, wherein execution of said code by said hardware processor causes the system to perform the following operations:

obtaining an audio recording of a meeting;

obtaining a transcript of said meeting from said audio recording;

allocating differential weight to utterances of different participants in said meeting;

determining an aggregate weight for a particular item in said meeting, based on cumulative weights of utterances of a plurality of participants in said meeting regarding said item;

if said aggregate weight is greater than a pre-defined threshold value, then: determining that said particular item is an approved decision or an approved action item.

\* \* \* \* \*